(12) United States Patent
Brabson et al.

(10) Patent No.: US 7,290,028 B2
(45) Date of Patent: Oct. 30, 2007

(54) METHODS, SYSTEMS AND COMPUTER PROGRAM PRODUCTS FOR PROVIDING TRANSACTIONAL QUALITY OF SERVICE

(75) Inventors: Roy Frank Brabson, Raleigh, NC (US); John L. Brady, Apex, NC (US); Wesley McMillian Devine, Apex, NC (US); Carroll E. Fulkerson, Jr., Raleigh, NC (US); Lap Thiet Huynh, Raleigh, NC (US); Constantinos Kassimis, Apex, NC (US); Patrick S. O'Donnell, Apex, NC (US); Arthur J. Stagg, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 09/760,975

(22) Filed: Jan. 16, 2001

(65) Prior Publication Data

US 2002/0046284 A1 Apr. 18, 2002

Related U.S. Application Data

(63) Continuation-in-part of application No. 09/693,268, filed on Oct. 20, 2000, which is a continuation-in-part of application No. 09/645,651, filed on Aug. 24, 2000, now Pat. No. 6,820,121.

(51) Int. Cl.
*G06F 15/16* (2006.01)

(52) U.S. Cl. .................. 709/203; 370/332; 370/412; 455/406

(58) Field of Classification Search ............... 709/235, 709/203; 370/332, 468, 412; 455/406, 401, 455/422, 437
See application file for complete search history.

(56) References Cited

U.S. PATENT DOCUMENTS

| | | | |
|---|---|---|---|
| 4,403,286 A | 9/1983 | Fry et al. .................. 364/200 |
| 4,495,570 A | 1/1985 | Kitajima et al. ............ 364/200 |
| 4,577,272 A | 3/1986 | Ballew et al. .............. 364/200 |
| 5,031,089 A | 7/1991 | Liu et al. .................... 364/200 |
| 5,515,508 A | 5/1996 | Pettus et al. |
| 5,548,723 A | 8/1996 | Pettus |
| 5,563,878 A | 10/1996 | Blakeley et al. |
| 5,675,739 A | 10/1997 | Eilert et al. ................ 395/200 |
| 5,787,019 A | 7/1998 | Knight et al. |
| 5,917,997 A | 6/1999 | Bell et al. .............. 395/182.02 |

(Continued)

OTHER PUBLICATIONS

A. Dahlin, et al. *EDDIE A Robust and Scalable Internet Server.* Ericsson Telecom AB, Stockholm, Sweden (May 1998).

(Continued)

*Primary Examiner*—Jinsong Hu
(74) *Attorney, Agent, or Firm*—Stevens & Showalter LLP

(57) ABSTRACT

Methods, systems and computer program products are provided for providing transactional quality of service providing transaction service level information from an application requesting a data transmission transaction to a communication process executing on a data processing system. The transaction service level information is provided separate from the data for the data transmission transaction. A quality of service level associated with the data transmission transaction is determined based on the transaction service level information received from the application. Other embodiments also provide for establishing a quality of service level without reference to transaction data content while further embodiments provide for establishing a quality of service level for responses.

35 Claims, 6 Drawing Sheets

U.S. PATENT DOCUMENTS

| | | | |
|---|---|---|---|
| 5,923,854 A | 7/1999 | Bell et al. | 395/200.73 |
| 5,935,215 A | 8/1999 | Bell et al. | 709/239 |
| 5,951,650 A | 9/1999 | Bell et al. | 709/238 |
| 6,038,603 A | 3/2000 | Joseph | |
| 6,091,710 A * | 7/2000 | Mawhinney | 370/236 |
| 6,169,748 B1 * | 1/2001 | Barbas et al. | 370/468 |
| 6,185,221 B1 * | 2/2001 | Aybay | 370/412 |
| 6,246,669 B1 * | 6/2001 | Chevalier et al. | 370/238 |
| 6,253,248 B1 | 6/2001 | Nakai et al. | |
| 6,389,479 B1 | 5/2002 | Boucher et al. | |
| 6,442,553 B1 | 8/2002 | Take | |
| 6,449,647 B1 | 9/2002 | Colby et al. | |
| 6,493,813 B1 | 12/2002 | Brandin et al. | |
| 6,542,488 B2 | 4/2003 | Walton et al. | |
| 6,549,699 B2 | 4/2003 | Belser et al. | |
| 6,556,824 B1 * | 4/2003 | Purnadi et al. | 455/434 |
| 6,556,982 B1 | 4/2003 | McGaffey et al. | |
| 6,625,689 B2 | 9/2003 | Narad et al. | |
| 6,631,122 B1 * | 10/2003 | Arunachalam et al. | 370/332 |
| 6,658,480 B2 | 12/2003 | Boucher et al. | |
| 6,678,518 B2 | 1/2004 | Eerola | |
| 6,683,853 B1 * | 1/2004 | Kannas et al. | 370/237 |
| 6,690,929 B1 * | 2/2004 | Yeh | 455/406 |
| 6,697,849 B1 | 2/2004 | Carlson | |
| 6,700,809 B1 | 3/2004 | Ng et al. | |
| 6,718,809 B1 | 4/2004 | Utyashev et al. | |
| 6,732,175 B1 * | 5/2004 | Abjanic | 709/227 |
| 6,765,909 B1 * | 7/2004 | Sen et al. | 370/392 |
| 6,917,617 B2 * | 7/2005 | Jin et al. | 370/395.21 |
| 2002/0091802 A1 | 7/2002 | Paul et al. | |
| 2002/0152307 A1 | 10/2002 | Doyle et al. | |
| 2003/0191829 A1 | 10/2003 | Masters et al. | |

OTHER PUBLICATIONS

Brochure entitled, *ACEdirector™ 8-PORT 10/100 MBPS Ethernet Switch*. Alteon WebSystems, San Jose, CA (1999).

Brochure entitled, *Enhancing Web User Experience with Global Server Load Balancing*. Alteon WebSystems, San Jose, CA (Jun. 1999).

Brochure entitled, *The Next Step in Server Load Balancing*. Alteon WebSystems, San Jose, CA (Nov. 1999).

Mac Devine. Presentation entitled, *TCP/IP Application Availability and Workload Balancing in the Parallel Sysplex*. Share Technical Conference (Aug. 22-27, 1999).

//w3.enterlib.ibm.com:80/cgi-bin/bookmgr/books/F1AF7001/1.3.1.2; 1.3.1.2.5 Virtual IP Addressing (VIPA); Excerpt from IP Configuration for OS/390, pp. 1-4 (1998).

//w3.enterlib.ibm.com:80/cgi-bin/bookmgr/books/F1AF7001/1.3.1.2; 1.3.20 Device and Link Statement—Virtual Devices (VIPA); Excerpt from IP Configuration for OS/390, pp. 1-3 (1998).

//w3.enterlib.ibm.com:80/cgi-bin/bookmgr/books/F1AF7001/1.3.1.2; 1.3.23. HOME Statement; Excerpt from IP Configuration for OS/390, pp. 1-6 (1998).

Hansen et al., *Dynamic Adaptation of Network Connections in Mobile Environments*, IEEE Internet Computing, Jan.-Feb. 1998.

Mac Devine. Presentation entitled, *Networking and the Parallel Sysplex*. OS/390 Expo and Performance Conference (Oct. 22, 1999).

Mac Devine. Presentation entitled, *The Parallel Sysplex: Concepts and Considerations*. Share Session 3406 (Mar. 5, 2000).

* cited by examiner

METHODS, SYSTEMS AND COMPUTER PROGRAM PRODUCTS FOR PROVIDING TRANSACTIONAL QUALITY OF SERVICE

RELATED APPLICATIONS

The present application is a continuation-in-part of application Ser. No. 09/693,268, filed Oct. 20, 2000, entitled "Methods, Systems and Computer Program Products for Server Based Type of Service Classification of a Communication Request" which is a continuation-in-part of application Ser. No. 09/645,651, filed Aug. 24, 2000 now U.S. Pat. No. 6,820,121, entitled "Methods, Systems and Computer Program Products for Processing an Event Based on Policy Rules Using Hashing" which are incorporated herein by reference as if set forth in its entirety.

FIELD OF THE INVENTION

The present invention relates to quality of service determinations and more particularly to transactional quality of service determinations by data processing systems.

BACKGROUND OF THE INVENTION

Computer networks have grown increasingly complex with the use of distributed client/server applications, mixed platforms and multiple protocols all in a single physical backbone. The control of traffic on networks is likewise moving from centralized information systems departments to distributed work groups. The growing utilization of computer networks is not only causing a move to new, high speed technologies, but is, at the same time, making the operation of computer networks more critical to day to day business operations. The use of quality of service (QoS) criteria for managing and/or contracting communication service level agreements (SLAs) is becoming increasingly common in networks, such as networks supporting Internet protocol (IP) communications.

The Internet Engineering Task Force (IETF) has proposed a set of policy schemas (object oriented models of policy classes and policy attributes) and a policy framework for managing future networks. The IETF proposed policy based networking technology is described in the Internet draft entitled "Policy Core LDAP Schema," draft-IETF-policy-core-schema-07.text, Jul. 14, 2000 ("IETF proposal"). Among other things, the IETF proposal includes three policy classes referred to as policy Rule, policy Action and policy Condition respectively. A policy rule (class policy rule) has the following semantics: "If Condition then Action." In other words, the actions (class policy action) specified by a policy rule are to be performed/executed only if the policy condition (class policy condition) evaluates to TRUE (i.e., is met).

Stated differently, the IETF proposal provides policy conditions which represent a set of criteria that are used to identify various groupings, such as host(s), routing, application(s), based on which, if the condition evaluates to TRUE, appropriate actions are performed. The application condition group, for example, includes, among other things, an attribute that is used to identify the content of the application data to be used in the policy condition evaluation. This data, for Web requests, generally represents the Universal Resource Indicator (URI) portion of the Universal Resource Locator (URL) or the directory where the object of the request is located.

Implementation of such policy rule based operations in time sensitive environments, such as a high speed network environment, can place time critical demands on processing capabilities of various network communication server devices. Rapid detection of the application data type or other aspects of a communication packet processed by a communication server may be critical, for example, where service differentiation by different data types is utilized to guarantee SLAs related to QoS.

As an example, in the environment of the worldwide Web (Web or Internet), each hypertext transport protocol (HTTP) type request can result in a different data type(s) being sent to a requesting client device from a server device. For example, an HTTP request may call for video/audio data streaming, transaction oriented data, File Transfer Protocol (FTP) data, etc. Different data types may require different service levels to be assigned while the data is being transmitted to the client. For instance, FTP type data generally requires low loss but is not highly sensitive to delays whereas video/audio data will typically be sensitive to delay but not to loss. Additionally, application specific information other than a URL, for example, the requesting user associated with a request, may be associated with a desired QoS.

Conventional systems implementing QoS criteria typically process requests with a type of service which is network based (as contrasted with endpoint (i.e., server or client based) or utilize unique TCP/IP port numbers to differentiate types of service required. Such an approach may fail to integrate all the desired elements to achieve consistent response time, for example, when processing web-based transactions which benefit from prioritization to achieve consistent response times. For example, such web-based requests are all typically managed at the same priority level which may result in downloads, browses and business transactions being managed at the same priority level with both network and server resources being applied equally across what may preferably be treated as three different priorities of workload. Such a result may be encountered in conventional systems as all such web-based requests typically travel through the network and arrive at the server using the same port (generally port 80 or port 443 if secured socket layer (SSL) communications are being used).

An example of such a QoS product is the Web Traffic Express product available from IBM corporation of Armonk, N.Y. which generally provides web associated quality of service in a separate device positioned between the server/client (endpoint) device and the communication network. This separate device may then determine network qualities of service, for example, using content based routing or based on network characteristics. Similar web QoS products are also available from Hewlett Packard Corporation and Cisco Corporation.

For content based routing (CBR) which may provide transactional QoS, such nodes typically rely on knowledge of the data content of communications by evaluating the communications. Such an evaluation of each communication may present scalability problems as the rate of communications grows if the contents of each communication is to be evaluated. Furthermore, when applications use secure communications, such as Secure Socket Layer (SSL) communications, data content of the communications are encrypted. Thus, network nodes will, typically, not be able to peer into the contents of the data without knowing the encryption/decryption keys. Gaining knowledge of these keys may compromise end-to-end security and present further scalability issues if data content must be decrypted, evaluated and encrypted as it passes through, for example, a routing node.

SUMMARY OF THE INVENTION

Embodiments of the present invention include methods, systems and computer program products for providing transactional quality of service by providing transaction service level information from an application requesting a data transmission transaction to a communication process executing on a data processing system. The transaction service level information is provided separate from the data for the data transmission transaction. A quality of service level associated with the data transmission transaction is determined based on the transaction service level information received from the application.

In further embodiments of the present invention, information corresponding to the quality of service level is incorporated into data transmissions associated with the data transmission transaction. The quality of service level information is incorporated separate from the data for the data transmission transaction. In particular, an indicator of a quality of service for the data transmission may be incorporated into the header of the data transmission. For example, quality of service level information may be incorporated into an Internet protocol (IP) header of data transmissions associated with the data transmission transaction. The quality of service level information may be, for example, a type of service value or a differentiated services code point value.

In embodiments of the present invention, the quality of service level may be established for data transmissions of the data provided with the request from the application for the data transmission transaction. In other embodiments, the data transmissions may be data transmissions for a connection associated with the request from the application for the data transmission transaction. In connection oriented embodiments of the present invention, it may be determined if the provided transaction service level information is provided for transactions associated with a connection of the communication process. The determined quality of service level may then be established as the quality of service level for subsequent data transmissions associated with the connection. In certain embodiments of the present invention, a quality of service level may be established by allocating system resources for a data processing system associated with the communication process which allocations are based on the determined quality of service for the data transmission. A quality of service level may also be established by establishing transmission parameters associated with the communication process which are based on the determined quality of service for the data transmission.

In additional embodiments of the present invention, it may be determined if a response associated with the data transmission transaction is received by the communication process. Resources of a data processing system associated with the application may be allocated to process the received response utilizing a quality of service level based on the determined quality of service of the data transmission established for the data transmission associated with the received response. Such a quality of service level for a response may be the same quality of service level as corresponding transmissions or may be different from the quality of service level for the transmission. The response may be an acknowledgment of a data transmission associated with the data transmission request. Furthermore, for connection oriented embodiments, the determination of whether a response associated with the data transmission transaction is received by the communication process may be made by determining if a response received by the communication process is associated with a connection associated with the data transmission transaction.

In still further embodiments of the present invention, the determination of a quality of service level may be made by determining if the transaction service level includes identification of a predefined quality of service level. If so, the predefined quality of service level may be used as the determined quality of service level. Furthermore, the determination of a quality of service level may be made utilizing a policy/rule database to determine the quality of service level by providing at least a portion of the transaction service level information to the policy/rule database.

In particular embodiments of the present invention, the communication process comprises a TCP/IP kernel. Furthermore, the communication process may be a communication protocol stack. In certain embodiments of the present invention, the data transmission transaction may be encrypted.

In further embodiments of the present invention, a quality of service level is established for the transmission of data by providing an application program interface to a communications process which both receives data to be transmitted by the communications process and receives quality of service information associated with the data to be transmitted so as to establish the quality of service level for the transmission of the data without reference to the contents of the data to be transmitted. Quality of service level information may also be incorporated into data transmissions separate from the data to be transmitted so as to allow network devices to establish the quality of service level for the data being transmitted without evaluating the contents of the data being transmitted. The quality of service level for the data transmitted may also be associated with responses received as a result of transmitting the data so as to establish a quality of service level for processing the response to the transmitted data. The quality of service level may be established for all data transmitted for a connection associated with the communications process.

In additional system embodiments of the present invention, a system for establishing a quality of service level for transmitted data is provided. The system includes a communications process circuit which includes a sendmsg( ) application program interface configured to receive data to be transmitted and quality of service information associated with the data to be transmitted, a policy service module configured to determine a quality of service level based on the quality of service information and a transmit/receive process configured to transmit the received data utilizing the determined quality of service level. The communications process may be a TCP/IP kernel.

A quality of service policy database may also be provided. In such embodiments, the policy service module is further configured to determine the quality of service level by referencing the quality of service policy database. The transmit/receive process may also be further configured to receive responses to the transmitted data and associate the quality of service level of the transmitted data with the received response.

The communications process may also include a user connection control block which contains a handle to a quality of service policy associated with the transmitted data and a transmission control block which contains a quality of service policy field which is set utilizing the quality of service policy of the user connection control block. The transmit/receive process may be further configured to prepare the data for transmission utilizing the quality of service policy field for the transmission control block.

While the invention has been described above primarily with respect to the method aspects of the invention, both systems and/or computer program products are also provided.

DETAILED DESCRIPTION OF PREFERRED EMBODIMENTS

Figure 1:
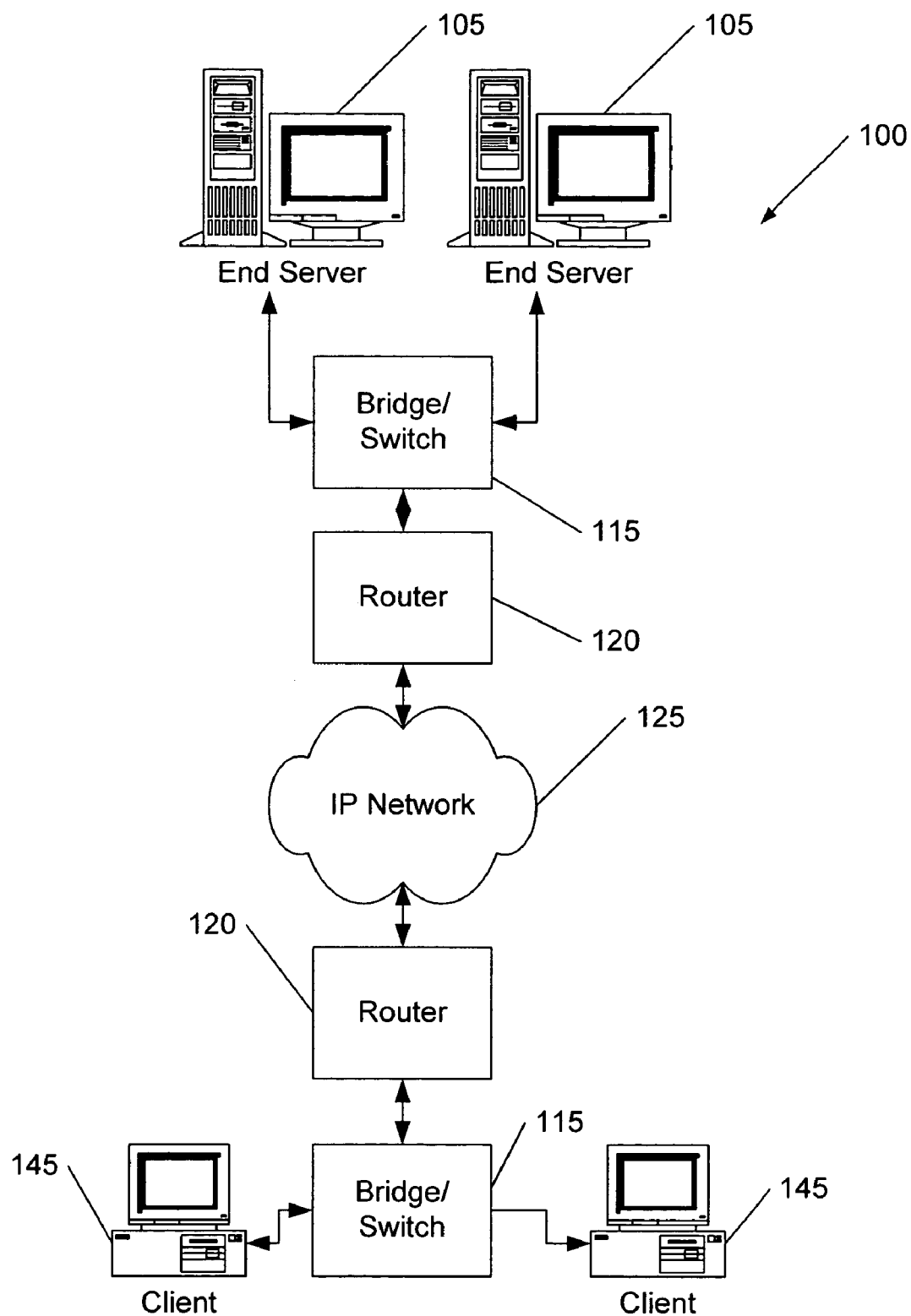
FIG. 1 is a block diagram of a network environment in which the present invention may be implemented.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, or partly on the user's computer and partly on a remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the operations specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the operations specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the operations specified in the flowchart and/or block diagram block or blocks.

Referring first to the block diagram illustration of FIG. 1, a network environment in which the present invention may be implemented will be generally described. As illustrated in FIG. 1, the communication network 100 includes a plurality of connecting nodes and endpoint nodes. As shown in FIG. 1, two endpoint servers 105 and two clients 145 are shown which are endpoints on the communication network 100. However, additional devices may be connected and a single computer device may serve as both a server and a client in different transactions and may further function as a connecting node between network 100 and another network. Accordingly, as used herein, the term "server" will refer to an endpoint node with respect to a communication request as contrasted with a router or bridge device.

As shown in FIG. 1, endpoint servers 105 connect through a bridge switch 115 and a router 120 to the IP network 125. Clients 145 are also connected to the IP network 125 through a bridge/switch 115 and a router 120. Additional bridge/switches 115 and routers 120 may be included in the IP network 125 as will be understood by one of ordinary skill in the art.

The communication network 100 may be provided by wired or wireless links using a variety of physical layer media and still stay within the teachings and scope of the present invention. Furthermore, while the present invention is described primarily in the context of communication networks and control of communication traffic on such networks, the present invention is not so limited and may be utilized beneficially in processing events based on type of service classifications, particularly in environments where processing speed for automatically identifying and executing an appropriate type of service is important. For example, fast methodologies for classifying Web based communication requests (such as those designated by an HTTP address) for assignment of appropriate QoS based on policy rules is desirable for use with communication servers handling communications over networks such as the communication network 100. The routers 120 may also operate to provide appropriate service levels to packets routed through the respective routers 120 based on network policy rules.

Quality of service determinations for processing of communication requests may be beneficially implemented in endpoint devices such as servers 105 or clients 145. Such capabilities may be particularly beneficial in light of emerging network trends where service differentiation of different data types is important in guaranteeing service level agreement (SLA) performance. Various embodiments of the present invention, as will be described herein, may provide communication servers which receive information directly from an application generating a communication to classify a Web request based, for example, on a policy definition, which classification may be used to assign an appropriate quality of service level for a request once a matching policy rule is found. This approach may reduce the overall number of policy rules that need to be evaluated for each event and processing of rules efficiently and in real time may be implemented for processing Web requests.

Figure 2:
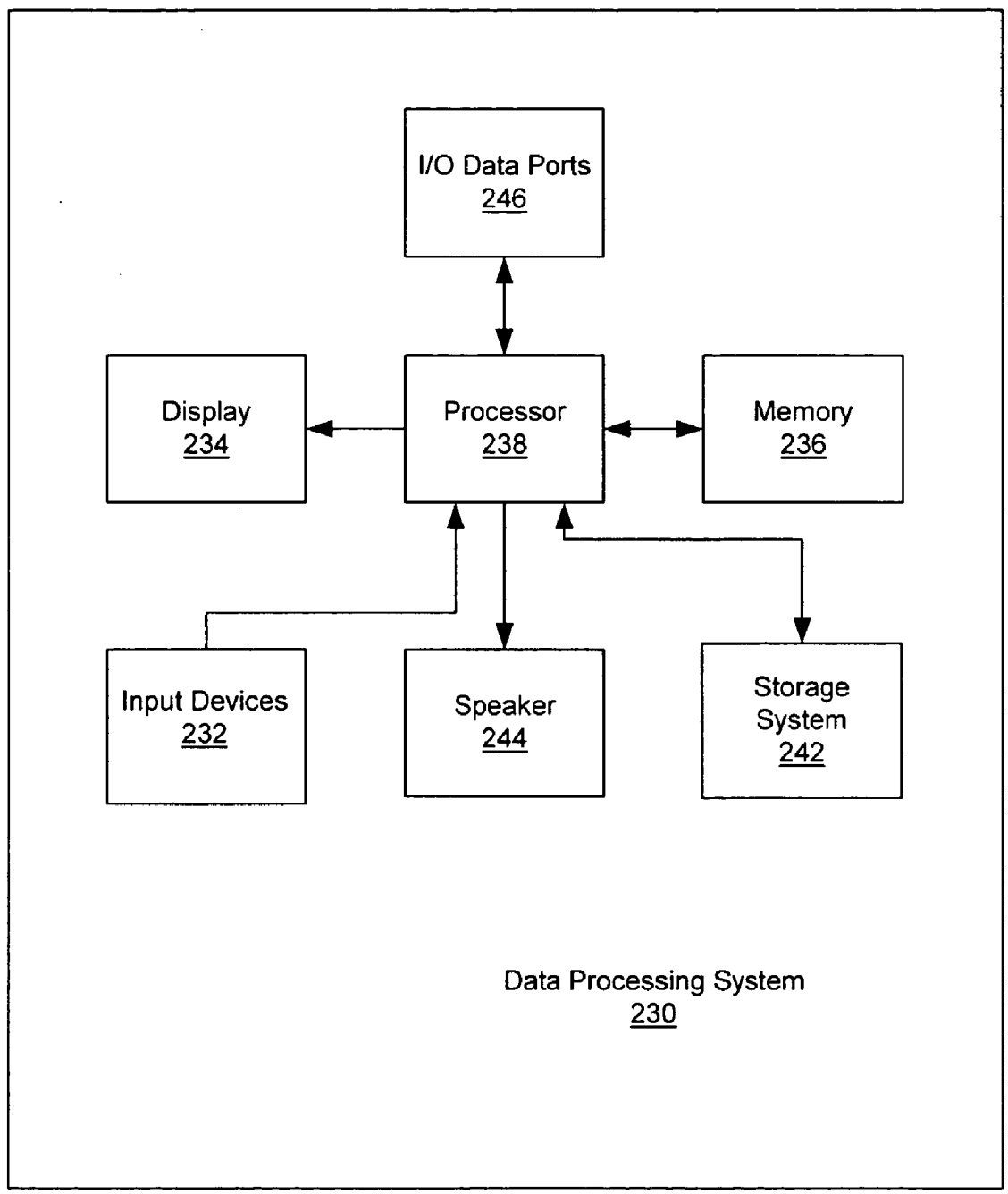
FIG. 2 is a block diagram of data processing systems according to embodiments of the present invention.

The present invention will now be further described with reference to the block diagram of FIG. 2 which illustrates data processing systems according to embodiments of the present invention. As illustrated in FIG. 2, the system 230 may include input device(s) 232 such as a keyboard or keypad, a display 234, and a memory 236 that communicate with a processor 238. The memory 236 can include, but is not limited to, the following types of devices: cache, ROM, PROM, EPROM, EEPROM, flash memory, SRAM, and DRAM. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port(s) 246 can be used to transfer information between the data processing system 230 and another computer system or a network (e.g., the Internet). Such data processing systems may include, for example, personal computers, laptop computers, mainframe computers, pervasive computing devices such as personal digital assistants, smartphones or the like, or even embedded processing systems. The components of a particular data processing system may be conventional or custom components, such as those used in many conventional computing devices, which may be configured to operate as described herein.

Figure 3:
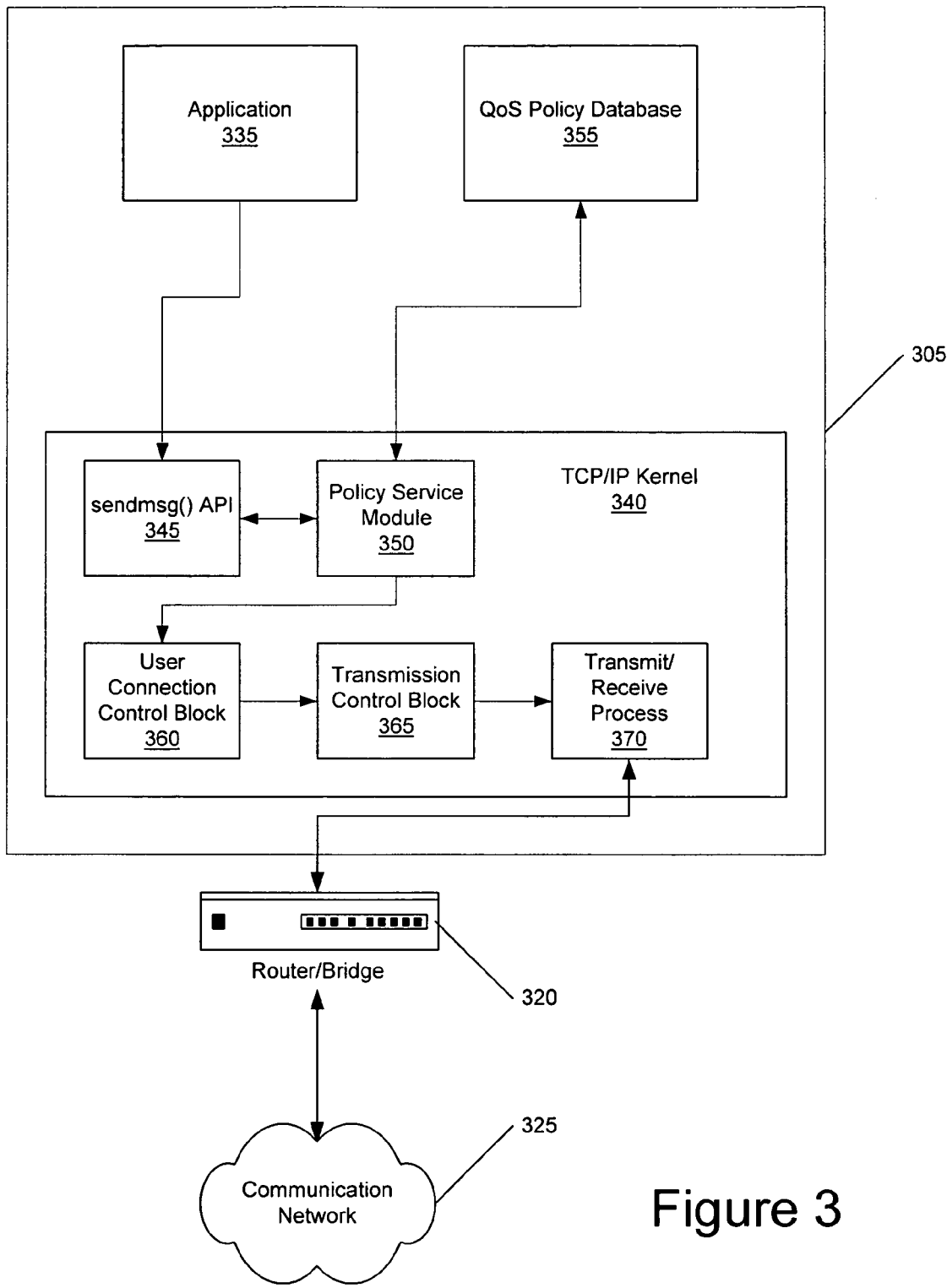
FIG. 3 is a more detailed block diagram of data processing systems according to embodiments of the present invention.

FIG. 3 is a block diagram of a data processing system that illustrates systems, methods, and computer program products in accordance with embodiments of the present invention. As shown in the embodiments of FIG. 3, a data processing system 305 such as a client or a server (or client device acting as a server in that it is receiving communication requests which result in outgoing communications initiated by an application executing thereon) includes application level processes and processes executing in the operating system kernel. As shown in FIG. 3, an exemplary application supporting communications over the communication network 325, identified as application 335, is illustrated. Furthermore, a QoS policy database 355 is also illustrated. For the illustration of FIG. 3, the communicating application 335 is shown as communicating with the communication network 325 using a TCP/IP protocol. Thus, a communications process such as the TCP/IP kernel 340 is shown as being included in the operating system kernel of the data processing system 305. It is to be understood that other kernel elements are typically also found on the data processing system 305, which other kernel elements may further support communications with applications over the communication network 325 using other layered protocols. Similarly, the communications process may be a communications protocol stack, such as a TCP/IP communications protocol stack, or other such process which may be provided separate from the operating system kernel but which may also provide for controlling data transmission transaction requests received from the application 335.

The TCP/IP kernel 340, as shown in FIG. 3, communicates with the communication network 325 through a router/bridge device 320. Where the router/bridge device 320 is a router, it typically routes communications packets based on level 4 information, such as destination IP address. Where the router/bridge device 320 is a bridge, it may process communications within a network node using level 3 information, such as machine identification number, rather than level 4 IP address information.

As shown in FIG. 3, the TCP/IP kernel 340 includes a sendmsg( ) application program interface (API) 345 which allows applications, such as the application program 335, to provide a request that specifies data to the TCP/IP kernel 340 to be communicated over the communication network 325 as part of a data transmission transaction associated with the invocation of the sendmsg( ) API 345 to request such a dat transmission transaction. Such communications may be originated by the application 335 or may be initiated responsive to an incoming communication directed to the application 335 which communication initiates subsequent outgoing communications from the server 305 based on content provided by the applications 335 responsive to the incoming communication request. While the present invention is described with reference to the sendmsg( ) API, other API's and other mechanisms for providing data to be transmitted over the communication network 325 may also be utilized. Such other API's or mechanisms would, as described herein, also incorporate into the request separate from the data to be transmitted, transaction service level information from which a quality of service level may be established. The particular request mechanism utilized may depend on the operating system of the data processing system 305, the communications process and/or the application 335. Collectively, the various mechanisms for specifying data to a communications process for transmission are referred to herein as requests for a data transmission transaction.

A policy service module 350 may also be provided which may create information for inclusion in a user connection control block 360 which may control communications for a connection of the application 335. The user connection control block may also be utilized by the TCP/IP kernel 340 to create a transmission control block 365 which is utilized by a transmit/receive process 370 to control a particular transmission using the communication network 325. It is to be understood that, in various embodiments of the present invention, a separate user connection control block 360 may be provided for each connection to the application 335 or other applications supporting communications with the communication network 325. Furthermore, a separate transmission control block 365 may be provided for each transmission on the communication network 325.

The sendmsg() API 345 obtains application level information from the received request for a data transmission transaction which provides transaction service level information from which a quality of service level may be established for the data transmission transaction. For example, in the context of a TCP/IP protocol communication as illustrated in FIG. 3, the sendmsg( ) API 345 may receive a specific QoS specification from the application 335 or it may receive application level information which may be evaluated to determine a QoS level. As used herein, QoS level refers to a value or values of network and/or processing parameters and/or policies or rules from which such parameters may be determined which are associated with a particular quality of service.

The sendmsg() API 345 may further utilize the policy service module 350 to assign a QoS level for data transmissions associated with a request for a data transmission transaction based upon the application level information or the QoS specification provided by the application 335. The QoS level may be incorporated into the user connection control block 360. The user connection control block 360 may in turn be used to create a transmission control block 365 which specifies the QoS of the transmission and is used by the transmit/receive process 370 to establish transmission parameters for the data transmission, allocate data processing system resources and/or incorporate a QoS token or other such specification in the header or other such un-encrypted portion of the transmission so that subsequent network nodes need not evaluate the data content of the message. The QoS level may also be utilized by the transmit/receive process 370 to allocate processor resources for processing responses to the data transmitted. Such a QoS level may be established on an individual transaction basis or on a connection basis.

As will be appreciated by those of skill in the art in light of the present disclosure, the transactional QoS specification according to embodiments of the present invention may also be coordinated with workload management such as described in commonly assigned U.S. patent application Ser. No. 09/693,268 entitled "Methods, Systems and Computer Program Products for Server Based Type of Service Classification of a Communication Request"

Also shown in FIG. 3 is a policy database 355 which may provide policy/rule information for use by the policy service module 350 for identifying a type of service. Such a policy/rules based approach to type of service determinations using hashing is described, for example, in application Ser. No. 09/645,651 which was incorporated by reference previously herein.

As will be appreciated by those of skill in the art, the operating system in which the present invention may be incorporated may be any operating system suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

Furthermore, while embodiments of the present invention are described with reference to particular operations and the creation of control blocks for controlling the transmission and/or receipt of data, as will be appreciated by those of skill in the art, other techniques may be utilized for controlling the QoS of a transaction. For example, databases, tokens, tags or other such mechanisms for associating a QoS level with data transmission and receipt may be utilized while still benefitting from the teachings of the present invention. Accordingly, the present invention should not be construed as limited to the particular use of control blocks as described herein. Similarly, while certain embodiments of the present invention provide the transaction service level information with the data to be transmitted, as will be appreciated by those of skill in the art, the transaction service level information may also be provided to the communication process in an operation separate from the operation which provides the data to be transmitted.

Operations according to various embodiments of the present invention will now be described further with reference to the flowchart illustrations of FIGS. 4-6. Operations begin with reference to FIG. 4 at block 400 when the application 335 requests a data transmission transaction by, for example, performing a sendmsg( ) socket call to the sendmsg( ) API 345. If the application 335 is providing transaction service level information along with data to be sent, then the application may indicate that ancillary data containing the transaction service level information which is separate from the data being provided. For example, a flag in the structure "msghdr" of the sendmsg( ) socket call indicating that ancillary data is being provided may be set. The communication process, such as the sendmsg( ) API 345 in the TCP/IP kernel 340, may determine if ancillary data is provided (block 405) and if not, then operations for the conventional processing of the data proceed. However, if ancillary data containing the transaction service level information is provided (block 405), then the transaction service level information may be evaluated to provide a QoS level based on the transaction service level information (block 410). The QoS level may be established for data transmissions resulting from a specific data transmission transaction request. Alternatively, the QoS level may be established for all data transmissions for a connection until modified by subsequent ancillary data. Alternatively, the QoS level may be set for all data transmissions until modified by subsequent ancillary data specifying a different QoS level.

As mentioned above, the transaction service level information may specify a QoS level or it may provide information which may be processed, for example, utilizing policies and rules, which may provide for determining the QoS level. For example, the sendmsg( ) socket call may invoke the policy service module 350 if the ancillary data flag is set and the policy service module may evaluate the ancillary data for transaction service level information. The evaluation may take the form of parsing the ancillary data for predefined QoS information which specifies a level of QoS, parsing the ancillary data for information from which a QoS level may be determined or a combination of the two. If QoS information is evaluated to determine the QoS level for a data transmission, then the QoS policy database 355 may be utilized as described above to determine a QoS level.

Where policy based rules are used to assign the QoS level at block 410, a fine grained differentiation of different QoS by transaction type may be provided in accordance with embodiments of the present invention. In other words, in various embodiments of the present invention, for example, web-based communications embodiments, communication processing transactions may be classified for different QoS levels by parsing the QoS information provided with the sendmsg( ) socket call to determine a policy-based priority for each class as to how it is to be processed (which may include allocation of resources such as central process unit (CPU) resources, allocation of memory resources and allocation of input/output (I/O) bandwidth).

Figure 4:
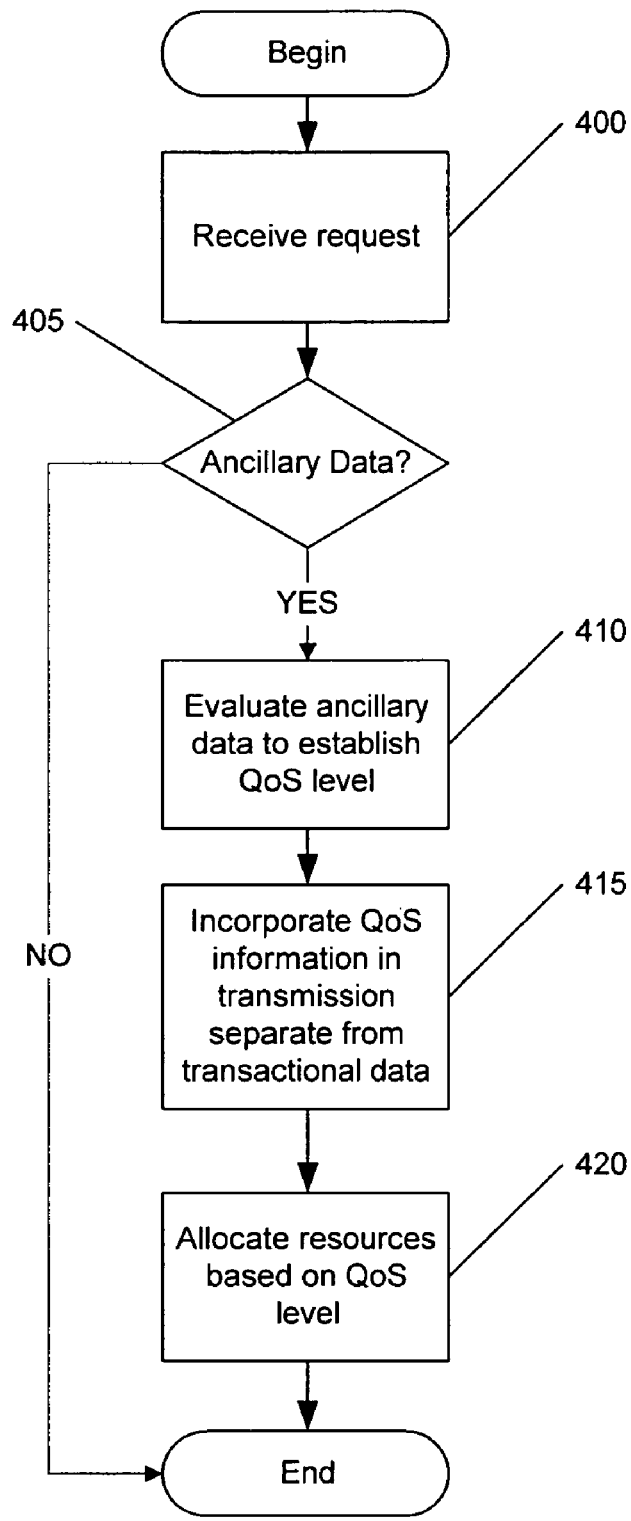
FIG. 4 is a flowchart illustrating operations according to embodiments of the present invention.

As is further illustrated in FIG. 4, optionally, an indicator of the QoS level may be incorporated into data transmissions separate from the data to be transmitted that was provided by the application (block 415). Such an incorporation may take the form of incorporating QoS level information into a header of the data transmissions, for example, an Internet protocol (IP) header. By way of example, a Type of Service or Differentiated Services Code Point value could be incorporated into IP headers of the data transmissions. As described above, the inclusion of QoS level into data transmissions may be established separately for each data transmission transaction, for data transmission transactions having common characteristics, such as associated with a common connection, or for all data transmissions until changed by subsequent ancillary data.

FIG. 4 also illustrates optional operations for utilizing the determined QoS level to allocate system resources associated with the data transmission transaction (block 420). Thus, for example, one or more of processor cycles, memory allocations, queue and/or buffer allocations, transmission bandwidth, transmission priority or other such processor resources or transmission parameters may be established based on the determined QoS level. As described above, such a resource allocation may be established separately for each data transmission transaction, for data transmission transactions having common characteristics, such as associated with a common connection, or for all data transmissions until changed by subsequent ancillary data.

Figure 5:
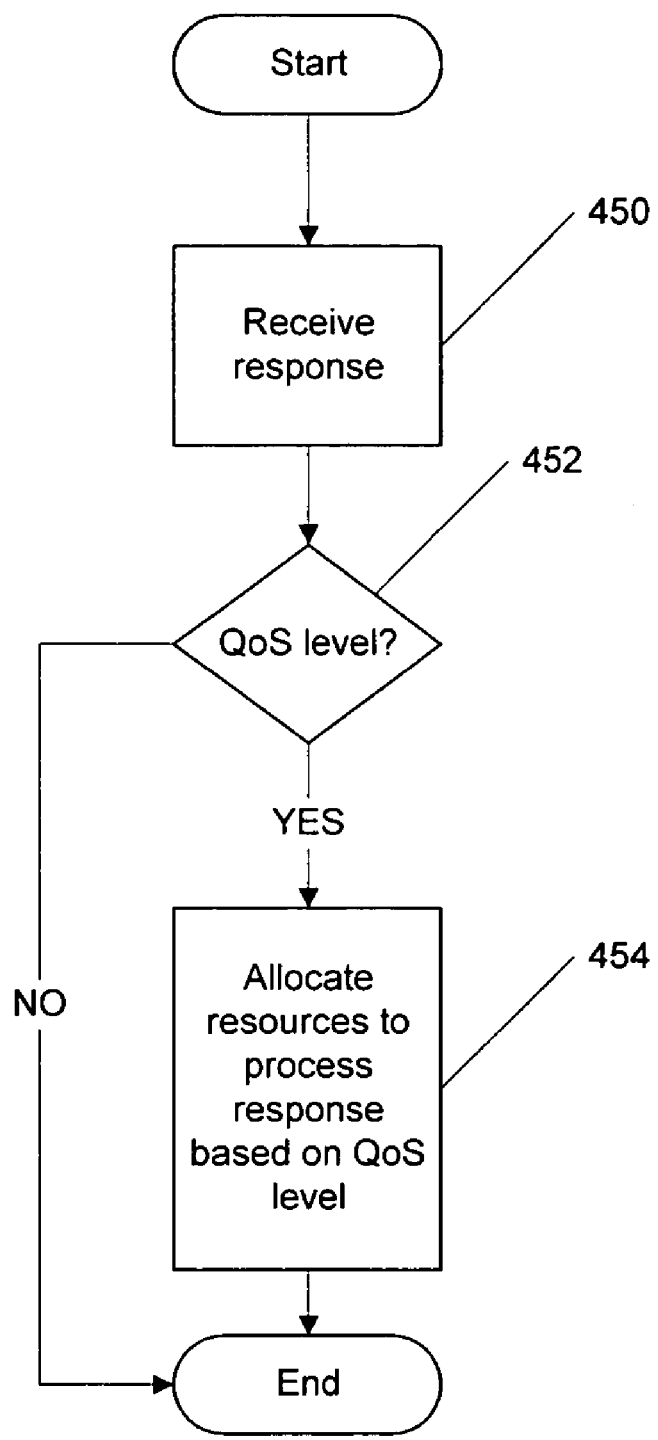
FIG. 5 is a flowchart illustrating operations according to embodiments of the present invention when a response is received to a data transmission.
Figure 6:
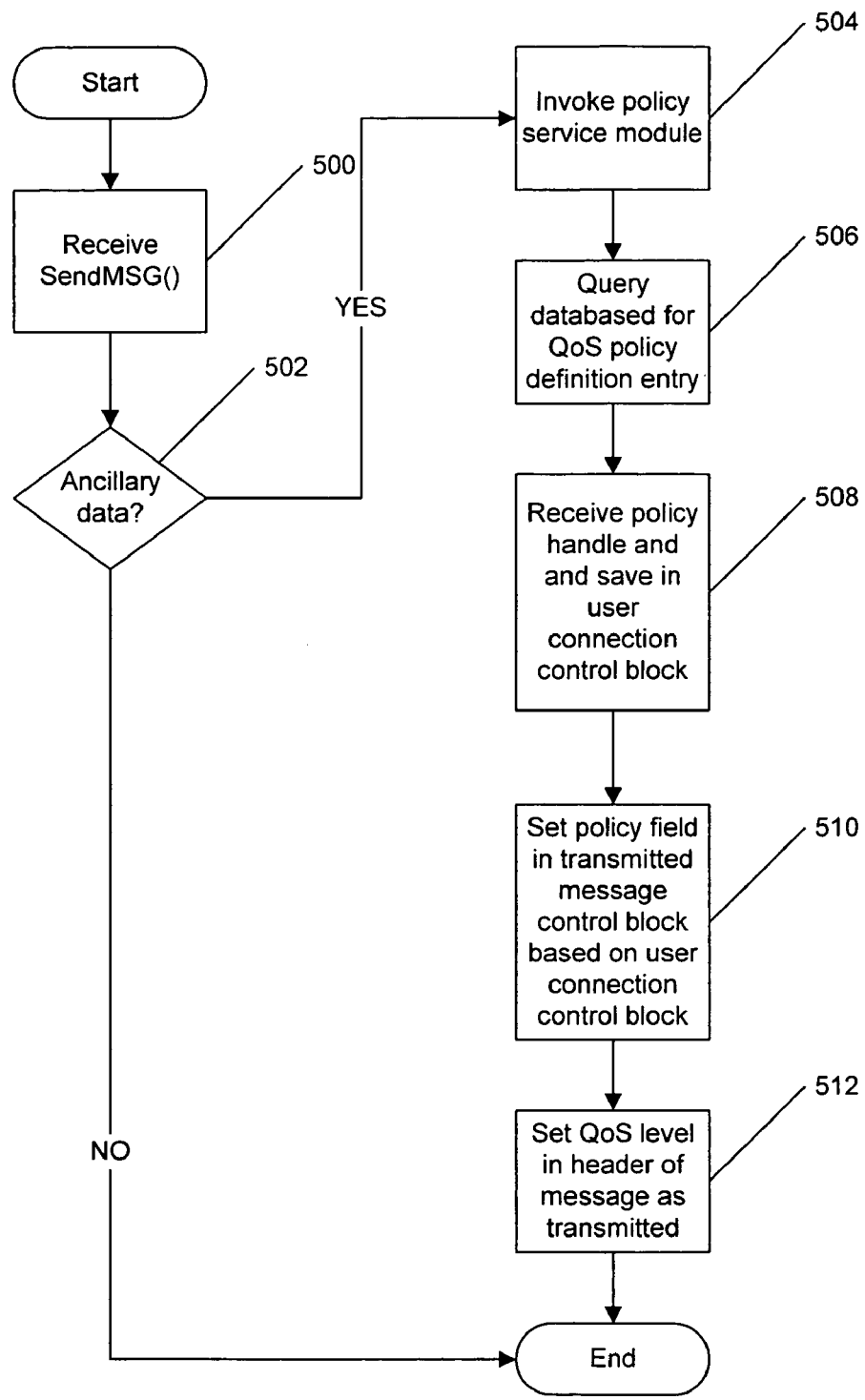
FIG. 6 is a flowchart illustrating operations according to further embodiments the present invention.

FIG. 5 illustrates operations according to embodiments of the present invention which also utilize the QoS level determined as described in FIG. 4 to control processing of responses. As seen in FIG. 5, a response is received to a previous data transmission (block 450). Such a response may be, for example, an acknowledge response. It is determined if a QoS level was established for the data transmission which resulted in the response (block 452). Such a determination may be made separately for each response, for responses to data transmission transactions having common characteristics, such as associated with a common connection, or for all data transmissions for a communications process until changed by subsequent ancillary data of a data transmission transaction request. If a QoS level was established (block 452), data processing system resources for processing the response are allocated based on the established QoS level (block 454). As described above, such a QoS level may specify particular parameter values or may specify rules for establishing such parameters. Thus, for example, a priority may be associated with the response based on the QoS level of the transmission.

Similarly, as described in the above reference U.S. patent application Ser. No. 09/693,268 entitled "Methods, Systems and Computer Program Products for Server Based Type of Service Classification of a Communication Request", allocation of resources may be coordinated with network prioritization by linking the classification policy for network prioritization with the server policies for workload prioritization. Doing so may improve consistency between the ways that required network and server resources are managed so that the most important work may receive preferences both on the data processing system and across the network carrying the communications. Linking the input classification of a communication and prioritization (for server workload management) to an outbound classification and prioritization (for network resource management and/or server workload management) using the same (or a related) policy may further help provide end-to-end consistent resource management according to the QoS/SLA requirements associated with the communication request.

Furthermore, as will be appreciated by those of skill in the art in light of the present disclosure, the QoS level for a response may be different than the QoS level for transmission of data. Such a difference could be provided by the ancillary data providing separate information for transmissions and responses.

Operations of particular embodiments of the present invention will now be described further with reference to various embodiments in FIG. 6. Operations begin at block 500 when a sendmsg( ) socket call is made by an application and received by the sendmsg( ) API 345 (block 500). The sendmsg( ) API 345 determines if ancillary data is present in the socket call from the application (block 502). Such operations will now be explained through a specific example in which transaction service level information may be passed as ancillary data which is pointed to in the "msghdr" structure which is a parameter passed in sendmsg( ). An example of the structure of the msghdr is shown here for reference:

```
struct msghdr {
    caddr_t         msg_name;
    u_int           msg_namelen;
    struct          iovec *msg_iov;
    u_int           msg_iovlen;
    caddr_t         msg_control;
    u_int           msg_controllen;
    int             msg_flags;
};
```

The ancillary data (the transaction service level information) is pointed to by the msg_control parameter. This msg_control pointer points to the following structure:

```
struct cmsghdr {
    u_int           cmsg_len;
    int             cmsg_level;
    int             cmsg_type;
    /* followed by u_char cmsg_data[]; */
};
```

The cmsg_len is set to the length of the cmsghdr, including the transaction service level specification in the cmsg_data area. The cmsg_level is set to IPPROTO_IP. The cmsg_type contains the following options:
  IP_SET_MSG_QOSLEVEL_W_APPL_TOKEN,
  IP_SET_MSG_QOSLEVEL_EXPEDITED,
  IP_SET_MSG_QOSLEVEL_HIGH,
  EP_SET_MSG_QOSLEVEL_MEDIUM,
  IP_SET_MSG_QOSLEVEL_LOW.

The following are used for setting the QoS level for the connection (or UDP session). Note that the connection level option may be specified on the first sendmsg( ) and all messages sent subsequently will carry the same connection QoS service level, until the next sendmsg( ) with a different QoS level is specified:
  IP_SET_CON_QOSLEVEL_W_APPL_TOKEN,
  IP_SET_CON_QOSLEVEL_EXPEDITED,
  IP_SET_CON_QOSLEVEL_HIGH,
  IP_SET_CON_QOSLEVEL_MEDIUM,
  IP_SET_CON_QOSLEVEL_LOW.

When IP_SET_MSGQOSLEVEL_W_APPL_TOKEN, IP_SET_CON_QOSLEVEL_W_APPL TOKEN type are used, the cmsg_data contains the application specific data (e.g., web URL/URI, user identification, etc.). The application specific data can be of different date types, e.g., hex data type, ASCII or EBCDIC data type, etc. For other types of specific QoS service level (e.g., EXPEDITED, HIGH, MEDIUM, LOW), no application specific data may be necessary.

Returning again to FIG. 6, when the sendmsg( ) API 345 detects that ancillary data is present, the policy service module 350 is invoked (block 504) and the ancillary data is provided to the policy service module 350. The policy service module 350 may query the QoS policy database 355 for a matching QoS policy definition entry to establish a QoS level based on the ancillary data (block 506). When a match is found, the policy service module 350 receives the QoS policy definition as a policy handle (i.e. a rule which will point to the corresponding policy QoS action) from the QoS policy database 355 and saves the policy handle in the user connection control block 360 (e.g., TCP/UDP control area) (block 508). The policy rule handle may be selected based on the specific QoS level requested by the application or the application specific data provided.

Because the QoS policy database may be revised to reflect changes in QoS parameters, the policies and rules as well as the results of selecting a particular QoS level may be changed transparent to the application. In fact, the parameters associated with a particular QoS level may even be dynamically updated based on processor status and/or network status. For example, bandwidth allocation based on QoS level may be revised based on system utilization such that reduced amounts of bandwidth are provided to low QoS level data transfer transactions when network resources are highly utilized and the amount of bandwidth provided may be increased as network resources are less utilized.

In any event, the policy handle in the user connection control block 360 is used to set the policy field in the transmission control block 365. As data is prepared for transmission by the transmit/receive process 370 the policy field of the transmission control block is referenced to establish the QoS level for the transmitted data (block 510). In particular embodiments, QoS level information is also incorporated into a header of the transmitted data such that the QoS level may be established in the communications network without reference to the data content of a message (block 512). Accordingly, QoS level information may be provided through the network even if the data content is inaccessible to the devices in the network, for example, if the data is encrypted.

As described above, embodiments of the present invention may provide for the QoS level of data transmitted by a data processing system being established by a communications process without reference to the contents of the data transmitted. Accordingly, the communications process may, for example, receive encrypted data from an application at a higher level in a communications protocol stack, while still being able to establish a QoS level for the associated data transmission. Such a QoS level may be established without the need to decrypt the data and, therefore, the communications process need not have access to decryption keys or other such information which may compromise the integrity of the encrypted data.

The flowcharts and block diagrams of FIGS. 1 through 6 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical operation(s). It should also be noted that, in some alternative implementations, the operations noted in the blocks may occur out of the order noted in the figures. For example, two blocks shown in succession may, in fact, be executed substantially concurrently, or the blocks may sometimes be executed in the reverse order, depending upon the operations involved.

In the drawings and specification, there have been disclosed typical preferred embodiments of the invention and, although specific terms are employed, they are used in a generic and descriptive sense only and not for purposed of limitation, the scope of the invention being set forth in the following claims.

That which is claimed:

1. A method for providing transactional quality of service within an endpoint data processing system, the method comprising the steps of:
   requesting a data transmission transaction by an application of said endpoint data processing system;
   providing transaction service level information corresponding to said application to a communication process of said endpoint data processing system;
   receiving said transaction service level information by said communication process;
   evaluating said transaction service level information at said endpoint data processing system;
   determining a quality of service level at said endpoint data processing system, wherein said quality of service level is associated with said data transmission transaction and is based on said transaction service level information received by said communication process; and
   performing a data transmission by said communications process corresponding to said data transmission transaction and said quality of service level.

2. A method according to claim 1, further comprising incorporating information corresponding to the quality of service level into data transmissions associated with the data transmission transaction, wherein the quality of service level information is incorporated separate from the data for the data transmission transaction.

3. A method according to claim 2, wherein the step of incorporating information comprises the step of incorporating into at least one header of at least one of the data transmissions an indicator of quality of service for the at least one of the data transmissions.

4. A method according to claim 2, wherein the step of incorporating comprises incorporating quality of service level information into an Internet protocol (IP) header field of data transmissions associated with the data transmission transaction.

5. A method according to claim 4, wherein the quality of service level information comprises at least one of a type of service value and a differentiated services code point value.

6. A method according to claim 2, wherein the data transmissions associated with the data transmission transaction are data transmissions transmitting data provided with a request from the application for the data transmission transaction.

7. A method according to claim 2, wherein the data transmissions are data transmissions for a connection associated with a request from the application for the data transmission transaction.

8. A method according to claim 2, wherein the data for the data transmission transaction is encrypted.

9. A method according to claim 1, further comprising the steps of:
   determining if the provided transaction service level information is provided for transactions associated with a connection of the communication process; and
   establishing the determined quality of service level as the quality of service level for subsequent data transmissions associated with the connection if the transaction service level information is provided for transactions associated with a connection of the communication process.

10. A method according to claim 9, wherein the step of establishing the determined quality of service level as the quality of service level for subsequent data transmissions associated with the connection comprises allocating system resources for a data processing system associated with the communication process which are based on the determined quality of service for the data transmission.

11. A method according to claim 10, wherein the step of establishing the quality of service level comprises the step of establishing transmission parameters associated with the communication process which are based on the determined quality of service for the data transmission transaction.

12. A method according to claim 1, further comprising establishing the determined quality of service level as the quality of service level for data associated with a request for a data transmission transaction from the application.

13. A method according to claim 12, wherein the step of establishing the determined quality of service level as the quality of service level for data associated with a request for a data transmission transaction from the application comprises allocating system resources for a data processing system associated with the communication process which are based on the determined quality of service for the data transmission transaction.

14. A method according to claim 1, further comprising the steps of:
determining if a response associated with the data transmission transaction is received by the communication process; and
allocating resources of a data processing system associated with the communication process to process the received response utilizing a quality of service level based on the determined quality of service of the data transmission transaction established for the data transmissions associated with the received response.

15. A method according to claim 14, wherein the response comprises an acknowledgment of a data transmission associated with the data transmission transaction.

16. A method according to claim 14, wherein the step of determining if a response associated with the data transmission transaction is received by the communication process comprises determining if a response received by the communication process is associated with a connection associated with the data transmission transaction.

17. A method according to claim 14, wherein the quality of service level utilized to allocate resources of the data processing system is different from the determined quality of service.

18. A method according to claim 1, wherein the step of determining a quality of service level comprises the steps of:
determining if the transaction service level includes an identification of a predefined quality of service level; and
utilizing the predefined quality of service level as the determined quality of service level if the transaction service level includes an identification of the predefined quality of service level.

19. A method according to claim 1, wherein the step of determining a quality of service level comprises utilizing a policy/rule database to determine the quality of service level by providing at least a portion of the transaction service level information to the policy/rule database.

20. A method according to claim 1, wherein the step of determining a quality of service level comprises utilizing a predefined quality of service level as the determined quality of service level if the transaction service level includes identification of the predefined quality of service level.

21. A method according to claim 1, wherein the communication process comprises a TCP/IP kernel.

22. A method according to claim 1, wherein the communication process comprises a communication protocol stack.

23. A method for establishing a transactional quality of service level within an endpoint data processing system for the transmission of data, comprising:
providing an application program interface to a communications process of an endpoint node, which both receives content data to be transmitted by the communication process and receives quality of service information associated with the data to be transmitted so as to establish the quality of service level for the transmission of the received content data without reference to the contents of the received content data to be transmitted, wherein:
said application program interface provides said quality of service level to said communication process based upon receiving at least one of a specific quality of service specification from a corresponding application associated with said endpoint data processing system or from application level information which is evaluated to determine said quality of service level at said endpoint data processing system.

24. A method according to claim 23, further comprising the step of incorporating quality of service level information into data transmissions separate from the received data so as to allow network devices to establish the quality of service level for the received data without evaluating the contents of the received data.

25. A method according to claim 23, further comprising the step of associating the quality of service level for the transmission of the received data with responses received as a result of transmitting the received data so as to establish a quality of service level for processing responses to transmission of the received data.

26. A method according to claim 23, wherein the quality of service level is established for all data transmitted for a connection associated with the communication process.

27. A system for establishing a quality of service level within an endpoint data processing system for transmitted data, comprising:
a communications process circuit comprising:
a send message application program interface configured to receive content data from at least one application associated with said endpoint data processing system to be transmitted and quality of service information separate from the content data to be transmitted;
a policy service module associated with said endpoint data processing system configured to determine a quality of service level based on the quality of service information; and
a transmit/receive process configured to transmit the received data utilizing the determined quality of service level.

28. A system according to claim 27, wherein the communications process comprises a TCP/IP kernel.

29. A system according to claim 27, further comprising a quality of service policy database and wherein the policy service module is further configured to determine the quality of service level by referencing the quality of service policy database.

30. A system according to claim 27, wherein the transmit/receive process is further configured to receive responses to the transmitted received data and associate the quality of service level of the transmitted received data with the received response.

31. A system according to claim 27, further comprising:
a user connection control block which contains a handle to a quality of service policy associated with the transmitted received data; and
a transmission control block which contains a quality of service policy field which is set based on the quality of service policy of the user connection control block; and
wherein the transmit/receive process is further configured to prepare the data for transmission based on the quality of service policy field of the transmission control block.

32. A system for providing transactional quality of service within an endpoint data processing system, comprising:
means for requesting a data transmission transaction by an application of said endpoint data processing system;
means for providing transaction service level information corresponding to said application to a communication process of said endpoint data processing system;
means for receiving said transaction service level information by said communication process;
means for evaluating said transaction service level information at said endpoint data processing system;
means for determining a quality of service level at said endpoint data processing system, wherein said quality of service level is associated with said data transmission transaction and is based on said transaction service level information received by said communication process; and
performing a data transmission by said communications process corresponding to said data transmission transaction and said quality of service level.

33. A system for establishing a quality of service level within an endpoint data processing system for the transmission of data, comprising:
an application program interface to a communication process of an endpoint node, which both receives content data to be transmitted by the communications process of the endpoint node and receives quality of service information associated with the data to be transmitted so as to establish the quality of service level for the transmission of the received content data without reference to the contents of the received content data, wherein:
said application program interface provides said quality of service level to said communication process based upon receiving at least one of a specific quality of service specification from a corresponding application associated with said endpoint data processing system or from application level information which is evaluated to determine said quality of service level at said endpoint data processing system.

34. A computer program product for providing transactional network quality of service within an endpoint data processing system, comprising:
a computer storage medium having computer readable program code embodied therein, the computer readable program code cause the following steps being executed:
requesting a data transmission transaction by an application of said endpoint data processing system; providing transaction service level information corresponding to said application for a data transmission transaction to a communication process of said endpoint data processing system;
receiving said transaction service level information by said communication process;
evaluating said transaction service level information at said endpoint data processing system;
determining a quality of service level at said endpoint data processing system, wherein said quality of service level is associated with said data transmission transaction and is based on said transaction service level information received by said communication process; and
performing a data transmission by said communications process corresponding to said data transmission transaction and said quality of service level.

35. A computer program product for establishing a quality of service level within an endpoint data processing system for the transmission of data, comprising:
a computer storage medium having computer readable program code embodied therein, the computer readable program code cause the following steps being executed:
providing an application program interface to a communications process of an endpoint node, which both receives content data to be transmitted by the communications process and receives quality of service information associated with the data to be transmitted so as to establish the quality of service level for the transmission of the received content data without reference to the contents of the received content data, wherein:
said application program interface provides said quality of service level to said communication process based upon receiving at least one of a specific quality of service specification from a corresponding application associated with said endpoint data processing system or from application level information which is evaluated to determine said quality of service level at said endpoint data processing system.

* * * * *